No. 686,044. Patented Nov. 5, 1901.
E. W. FLINT.
HOLDER FOR REPAIRING BICYCLES.
(Application filed Mar. 1, 1901.)
(No Model.)
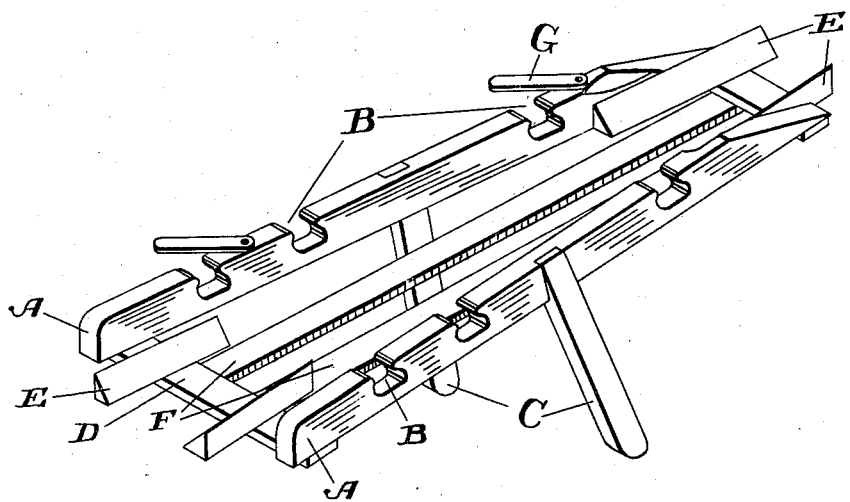
WITNESSES
Chas. L. Hyde.
Mattie McGinnis.
INVENTOR
Eugene W. Flint
BY HIS ATTORNEYS
Hazard & Harpham

UNITED STATES PATENT OFFICE.

EUGENE W. FLINT, OF PASADENA, CALIFORNIA.

HOLDER FOR REPAIRING BICYCLES.

SPECIFICATION forming part of Letters Patent No. 686,044, dated November 5, 1901.

Application filed March 1, 1901. Serial No. 49,498. (No model.)

*To all whom it may concern:*

Be it known that I, EUGENE W. FLINT, a citizen of the United States, residing at Pasadena, in the county of Los Angeles and State of California, have invented a new and useful Holder for Repairing Bicycles, of which the following is a specification.

My invention relates to a holder designed for holding the bicycle in position, so that all parts of either wheel can be readily reached in repairing the same, and which may be used as a rack to hold the bicycle in an ordinary upright position; and the object thereof is to provide a simple and inexpensive device for said purpose. I accomplish this object by the holder described herein, and illustrated in the accompanying drawing, which is a perspective view of my device.

In the drawing, A A are the retaining-rails of my holder, which are preferably wider apart at one end than the other to provide a holder adapted to hold bicycles of different sizes. These rails are provided with transverse notches B to receive the handle-bars of the machine when it is turned upside down in the holder to be repaired. Downwardly-projecting legs are affixed centrally to these rails to hold one or the other of the ends of the holder elevated. They are of such length that when a bicycle is in the holder for repair the wheel at the elevated end of the holder is at a suitable height for convenient access to the parts requiring repair. On the upper side of the cross-bars D, which hold the retaining-rails together, are affixed triangular blocks E at each end of the holder, one pair of which blocks support the saddle when the bicycle is in the holder for repair. Said blocks also act as guides to guide the wheels of the bicycle when run into the holder in an upright position between the longitudinal supporting-bars F, affixed, preferably, to the under side of the cross-bars which join the retaining-rails. These supporting-bars hold the bicycle in an upright position while the tire is being pumped up or the machine is being cleaned. I prefer to have the supporting-legs spread at the bottom, so as to act as braces to prevent the holder from tipping over. I have provided the retaining-rails with notches G, which may be turned at one end to hold the handle-bars in the notches and at the other end to hold the saddle on the guide-blocks.

Instead of transverse notches in the retaining-rails other suitable means, such as straps or other catches, may be used to hold the bicycle in the holder, and other means may be adopted to provide for the tilting of the supporting-rails of the holder, such as providing legs that will rest on the floor and pivotally attaching the rails thereto. It will be observed that by this construction either end of the holder can be tilted up, so as to bring the wheel at that end to a suitable height for repairing without removing the wheel from the holder. The supporting-legs and transverse notches are so arranged that when a wheel is in the holder for repairs the weight of the end resting on the floor holds the other end elevated.

Having described my invention, what I claim as new, and desire to secure by Letters Patent, is—

1. A holder, for holding bicycles while being repaired, comprising two retaining-rails having transverse notches in the upper edges thereof; cross-bars attached to the retaining-rails at each end thereof; supporting-legs centrally attached to the retaining-rails, adapted to hold one end of the holder, at a time, in an elevated position.

2. A holder, for holding bicycles while being repaired, comprising two retaining-rails, having the ends thereof closer together at one end of the holder than at the other, and also having transverse notches in the upper edges thereof; cross-bars attached to the retaining-rails at each end thereof; guide-blocks affixed to the upper side of said cross-bars; longitudinal supporting-bars between the supporting-rails affixed to the cross-bars, and supporting-legs centrally affixed to the retaining-rails.

3. A holder for holding bicycles while being repaired, comprising two retaining-rails united by cross-bars; supporting-legs centrally attached to the supporting-rails, adapted to hold one end at a time of said rails in an elevated position; and means to attach a bicycle to the retaining-rails, centrally over the supporting-legs.

In witness that I claim the foregoing I have hereunto subscribed my name this 21st day of February, 1901.

E. W. FLINT.

Witnesses:
G. E. HARPHAM,
MATTIE MCGINNIS.